US008669945B2

(12) United States Patent
Coddington

(10) Patent No.: US 8,669,945 B2
(45) Date of Patent: Mar. 11, 2014

(54) CHANGING OF LIST VIEWS ON MOBILE DEVICE

(75) Inventor: Nicole Coddington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 12/437,421

(22) Filed: May 7, 2009

(65) Prior Publication Data

US 2010/0283743 A1 Nov. 11, 2010

(51) Int. Cl.
*G06F 3/041* (2006.01)
*G06F 3/033* (2013.01)

(52) U.S. Cl.
USPC .......................................... 345/173; 715/863

(58) Field of Classification Search
USPC ........................ 345/173; 715/862, 863, 864
See application file for complete search history.

(56) References Cited

U.S. PATENT DOCUMENTS

| | | | |
|---|---|---|---|
| 5,784,061 A | 7/1998 | Moran et al. | |
| 7,469,381 B2 | 12/2008 | Ording | |
| 8,130,205 B2* | 3/2012 | Forstall et al. | 345/173 |
| 2006/0117067 A1 | 6/2006 | Wright et al. | |
| 2007/0247422 A1 | 10/2007 | Vertegaal et al. | |
| 2008/0126937 A1 | 5/2008 | Pachet | |
| 2008/0165141 A1* | 7/2008 | Christie | 345/173 |
| 2008/0180408 A1* | 7/2008 | Forstall et al. | 345/177 |
| 2008/0309632 A1 | 12/2008 | Westerman et al. | |
| 2009/0073194 A1* | 3/2009 | Ording | 345/173 |
| 2010/0134425 A1* | 6/2010 | Storrusten | 345/173 |

OTHER PUBLICATIONS

"Portable Digital Photo Album", Retrieved at<<http://www.charlesyiu.acsite.org/portfolio2/files/418FinalReport/index.html>>, EECE418 Project Final Report, pp. 1-7.
White Charlie, "Apple's Gesture Dictionary, a Fingering Chart for Multi-Touch", Retrieved at<<http://gizmodo.com/gadgets/patents/apples-gesture-dictionary-a-fingering-chart-for-multi+touch-285176.php>>, Aug. 2, 2007, pp. 1-2.
"Chiral Motion Will Change the Way you Scroll", Retrieved at<<http://www.freakitude.com/2008/10103/chiral-motion-will-change-the-way-you-scroll/>>, pp. 6.
"Surface and Multi-Touch", Retrieved at<<http://blogs.msdn.com/paul_maher/archive/2008/07/10/surface-and-multi-touch.aspx>>, pp. 5.
O'Grady, et al. "Multi-Touch Gestures in any Application", Retrieved at<<http://blogs.zdnet.com/Apple/?p=1361>>, Mar. 2, 2008, pp. 2.

* cited by examiner

*Primary Examiner* — Kevin M Nguyen
(74) *Attorney, Agent, or Firm* — Aaron Chatterjee; Andrew Sanders; Micky Minhas

(57) ABSTRACT

Various embodiments related to a hand-held mobile computing device are disclosed. One disclosed embodiment comprises a hand-held mobile computing device having a touch-sensitive display forming a surface of the hand-held mobile computing device configured to receive touch input. The hand-held mobile computing device further comprises a processor and memory comprising code executable by the processor to display a scrollable list of items in a first content viewing mode having a first set of content for each of the items in the scrollable list, to detect a dynamic multi-touch gesture over the scrollable list of items, and to change the scrollable list of items to a second content viewing mode responsive to detection of the dynamic multi-touch gesture, wherein the second content viewing mode comprises a second set of content for each item in the scrollable list of items.

8 Claims, 7 Drawing Sheets

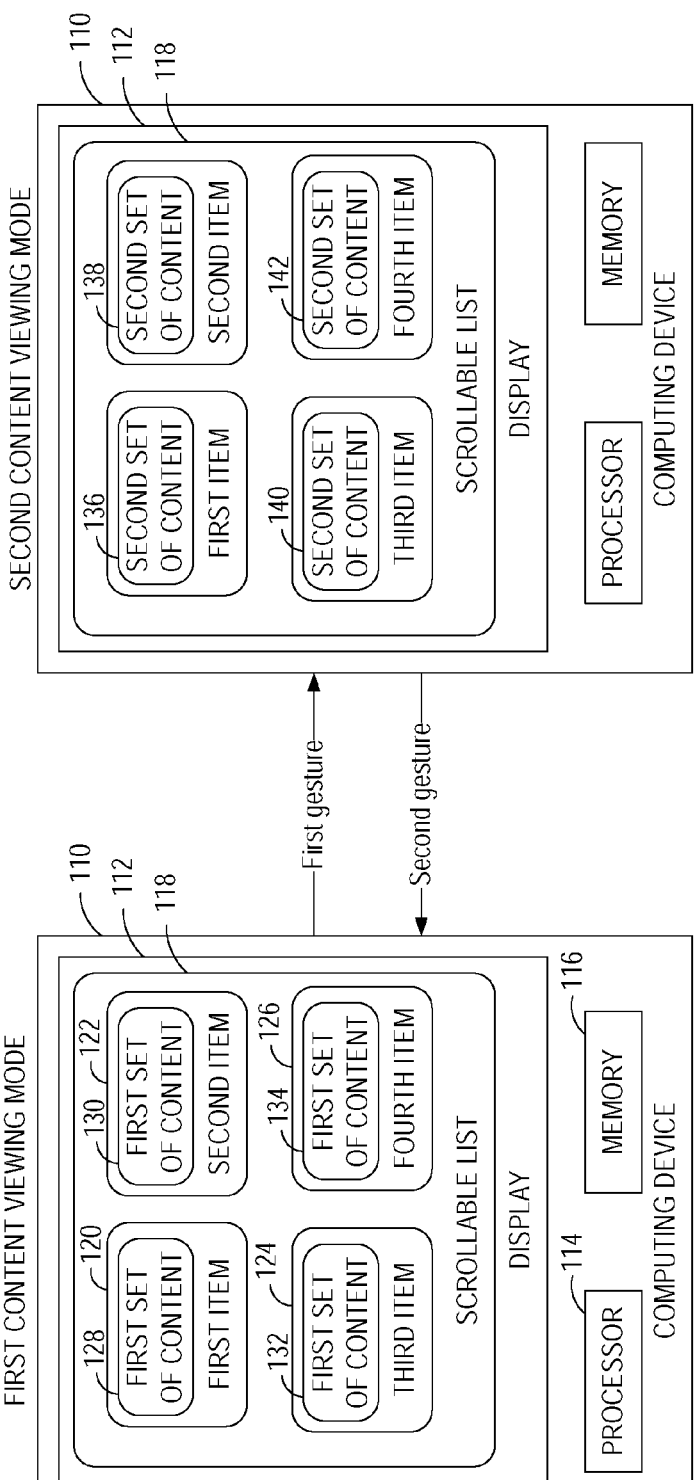
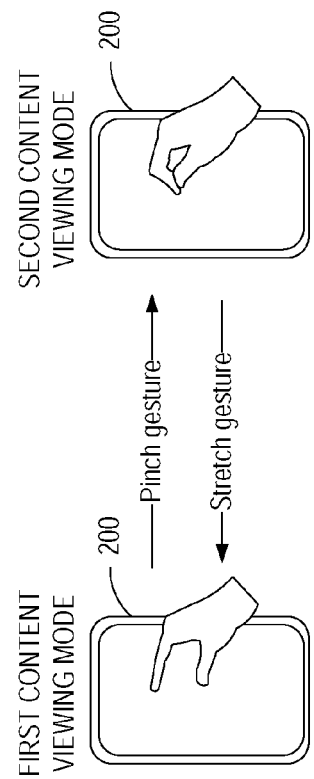
FIG. 1
FIG. 2

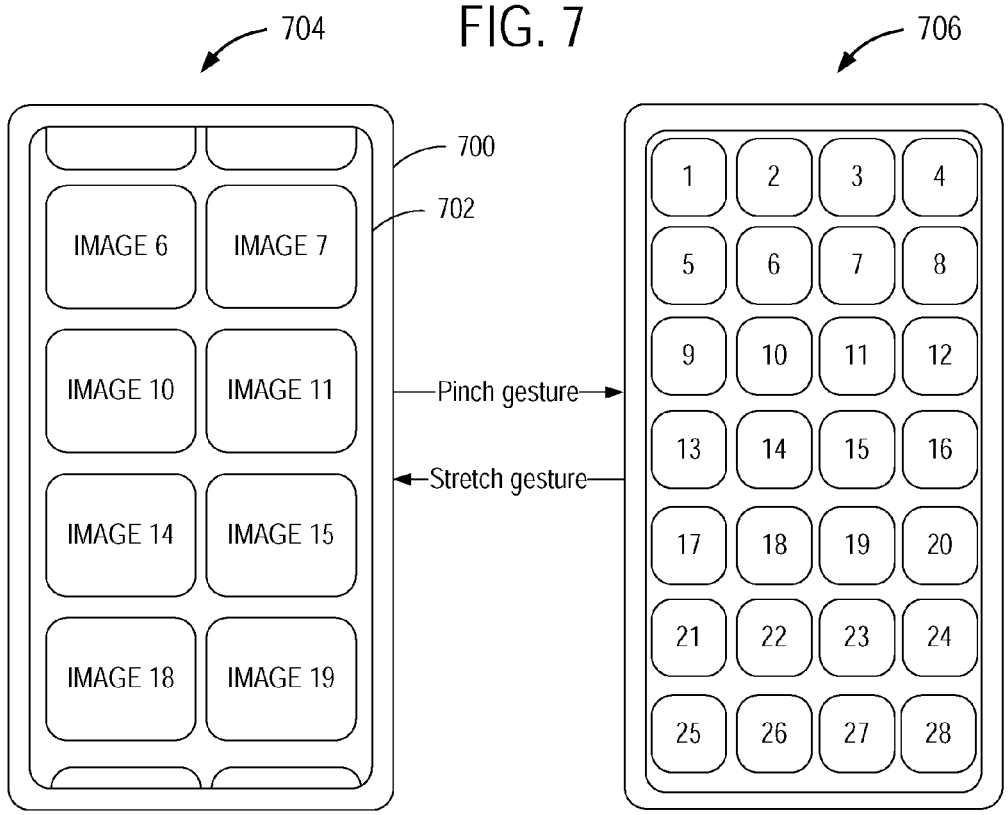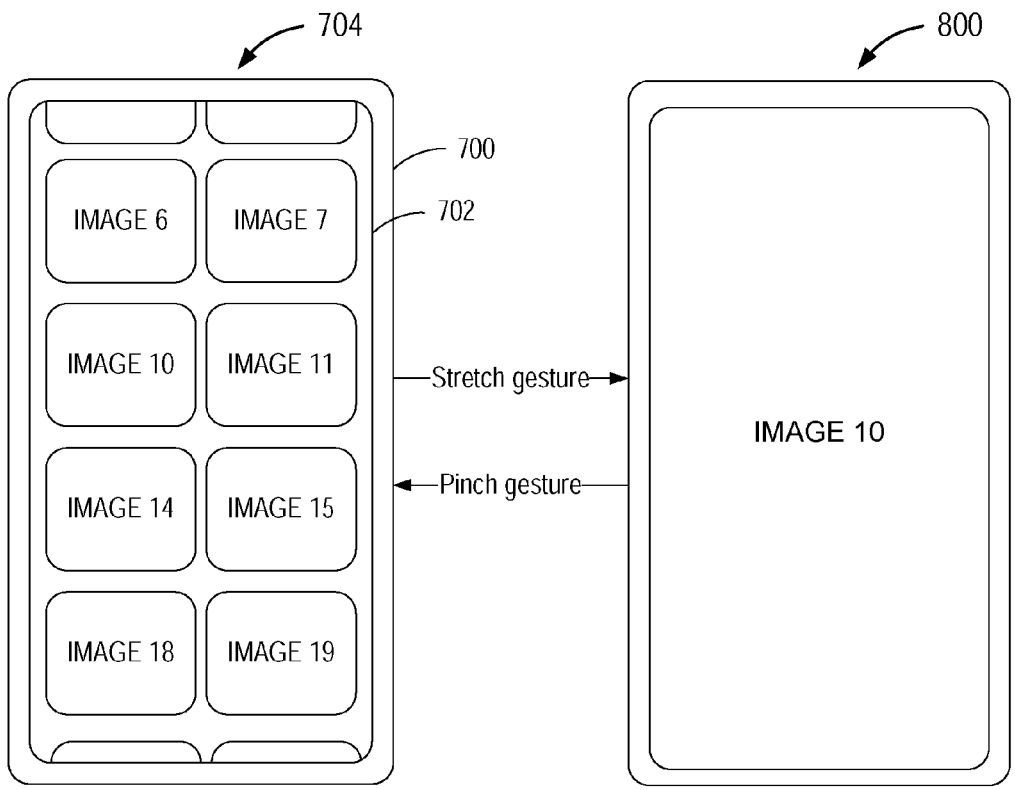

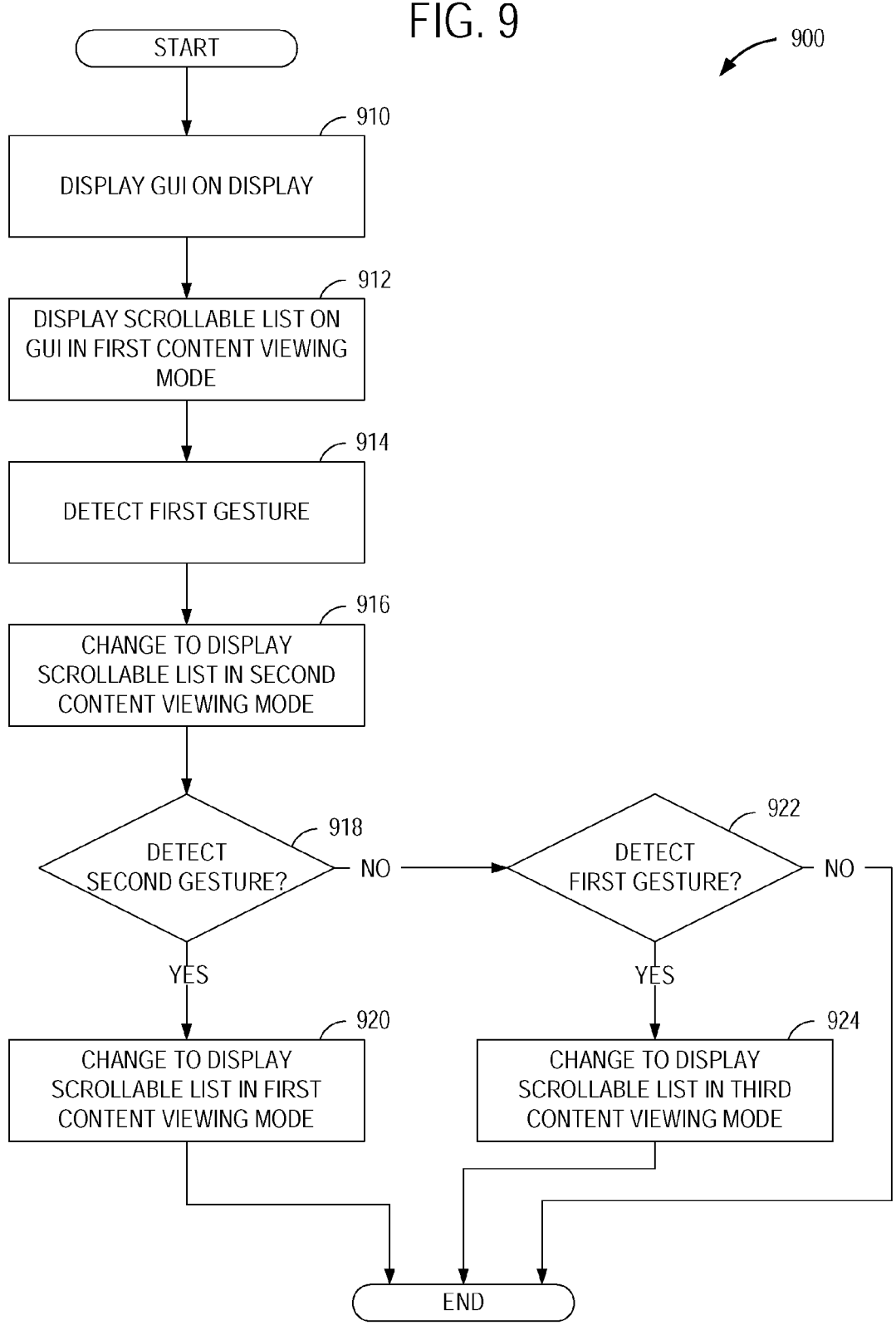

CHANGING OF LIST VIEWS ON MOBILE DEVICE

BACKGROUND

Computing devices often utilize graphical user interfaces capable of receiving inputs via a pointer-based input device such as a mouse, track ball, touch-sensitive display, and the like. Navigation of such graphical user interfaces may involve using pull-down, or drop-down, menus whereby lists of options are presented for user selection. In some graphical user interfaces, a user may select to view a list of items in any of a plurality of viewing modes, such as an icon mode, list mode, detailed list mode, etc. A user may be able to change between such viewing modes by selecting a desired mode from such a pull-down menu. However, where such user interfaces are on mobile devices and other environments with relatively small touch-sensitive display screens, manipulation of such pull-down menus may be awkward, and thereby may result in erroneous input.

Some devices may comprise a multi-touch display capable of detecting multiple temporally-overlapping touch inputs. Such multi-touch displays may enable the use of a broader range of touch-based inputs than a single-touch input device. However, current pointer-based graphical user interfaces may not be configured to utilize the capabilities of a multi-touch display input device.

SUMMARY

Various embodiments related to a hand-held mobile computing device are disclosed. For example, one embodiment provides a hand-held mobile computing device comprising a touch-sensitive display forming a surface of the hand-held mobile computing device configured to receive touch input. The hand-held mobile computing device further comprises a processor and memory comprising code executable by the processor to display a scrollable list of items in a first content viewing mode having a first set of content for each of the items in the scrollable list, to detect a dynamic multi-touch gesture over the scrollable list of items, and to change the scrollable list of items to a second content viewing mode responsive to detection of the dynamic multi-touch gesture, wherein the second content viewing mode comprises a second set of content for each item in the scrollable list of items.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a schematic view of an embodiment of a hand-held mobile computing device in two content viewing modes.

FIG. 2 schematically shows embodiments of touch-input gestures performed on an embodiment of a hand-held mobile computing device.

FIG. 7 is a schematic view of an embodiment of a hand-held mobile computing device displaying a scrollable list of image items in two content viewing modes.

FIG. 8 is a schematic view of another embodiment of a hand-held mobile computing device displaying a scrollable list of image items in two content viewing modes.

FIG. 9 is a flowchart illustrating an embodiment of a method for operating a hand-held mobile computing device.

DETAILED DESCRIPTION

Figure 3:
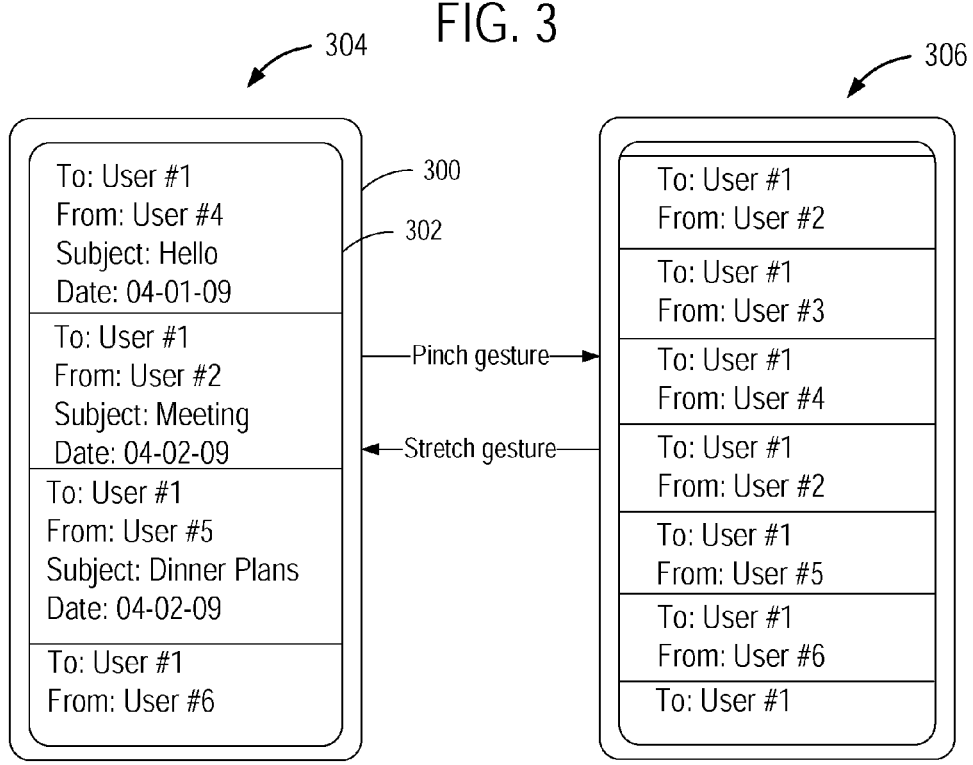
FIG. 3 is a schematic view of an embodiment of a hand-held mobile computing device displaying a scrollable list of text items in two content viewing modes.

Various embodiments are disclosed herein related to changing content viewing modes for lists displayed on a mobile device via multi-touch gestures. The term "content viewing mode" as used herein refers to a set of content that is shown for each item in a list, an organization and/or an arrangement of content in each list item, and/or arrangement of the list. For example, in the case of a list of sub-folders contained within a parent folder, different viewing modes for displaying the folders may comprise an icon view, a list view, and a detailed list view. Likewise, for a calendar, examples of different viewing modes may comprise a monthly calendar, a scrollable calendar wheel that lists dates in a vertically or horizontally-oriented column, and a detailed single date view. It will be understood that these views are disclosed for the purpose of example, and are not intended to be limiting in any manner.

FIG. 1 is a schematic view of an embodiment of a hand-held mobile computing device 110. The hand-held mobile computing device 110 includes a touch-sensitive display 112 forming a surface of the hand-held mobile computing device 110. The hand-held mobile computing device 110 also includes a processor 114, and memory 116 comprising code executable by the processor 114 to display a scrollable list 118 of items. The scrollable list 118 is illustrated as including a first item 120, a second item 122, a third item 124, and a fourth item 126 in a first content viewing mode. However, it may be understood that a scrollable list of items may include any number of items. It will further be understood that a "scrollable list" may in specific instances contain sufficiently few items to display all items without scrolling.

The use of the term "scrollable list" is used herein to describe a list of displayable items that can be selectively viewed as sections of a list responsive to user input indicating a desired movement ("scroll") in any direction (e.g., up, down, left, right, diagonally). For example, a first section of a list may be displayed, and responsive to user input indicating a downward movement a second section of the list may be displayed, where the second section may or may not include portions of the first section.

The scrollable list 118 displayed in the first content viewing mode includes a first set of content for each of the items in the scrollable list 118 (e.g., first set of content 128 for first item 120, first set of content 130 for second item 122, first set of content 132 for third item 124, first set of content 134 for fourth item 126). As will be described in detail herein, a first set of content may specify one or more parameters for each item, such as an amount of included text, a display format or arrangement, a zoom level for a photograph, a size and/or location of a graphical element, etc.

The code in memory 116 is also executable to detect a dynamic multi-touch gesture (e.g., a first gesture) over the scrollable list 118. Responsive to detection of the first gesture, the code may be executable to change the scrollable list 118 to a second content viewing mode having a second set of content for each item in a scrollable list 118 (e.g., second set of content 136 for first item 120, second set of content 138 for second item 122, second set of content 140 for third item 124, second set of content 142 for fourth item 126). Likewise, the code is executable to detect a second dynamic multi-touch gesture (e.g., a second gesture) over the scrollable list 118, and responsive to detection of the second gesture, to change the scrollable list 118 from the second content viewing mode to the first content viewing mode.

The change between the first content viewing mode and the second content viewing mode may occur in any suitable manner. For example, the change may occur as a "snap" between modes. The term "snap" as used herein signifies that the display changes between discrete viewing mode settings. Such a snap between viewing mode settings may be animated or may occur without animation. Further, where the change is animated, the animated change may occur at any suitable rate.

The scrollable list may be displayed in a graphical user interface (not shown), such as a multi-touch graphical user interface. A multi-touch graphical user interface may be interoperable with a computing device to receive and utilize multiple temporally overlapping touch inputs from multiple fingers, styluses, and/or other such manipulators. Such graphical user interfaces may include a display system configured to display an image to a user, and a multi-touch input mechanism that is configured to detect multiple temporally overlapping touches over the display. The use of a multi-touch graphical user interface may enable the utilization of a broader range of touch-based inputs than a single-touch input device.

Turning now to FIG. 2, schematic embodiments of touch-input gestures performed on an embodiment of a hand-held mobile computing device 200 are shown. Specifically, dynamic multi-touch gestures including more than one concurrent touch inputs are illustrated.

Where the dynamic multi-touch gesture includes a pinch gesture having two touch inputs, code may be executable by a processor of the hand-held mobile computing device 200 to detect a pinch gesture if a change in distance between the two touch inputs is greater than a pinch threshold change. Responsive to detection of a pinch gesture, the code may be executable to change the scrollable list of items to a second content viewing mode. That is, if the change in distance between a thumb touch input and a forefinger touch input is greater than a threshold change in a direction indicating that a pinch is being performed (e.g., distance between touch inputs is decreasing), a pinch gesture may be detected, and thus the scrollable list of items may be changed to the second content viewing mode.

Where the dynamic multi-touch gesture is a stretch gesture having two touch inputs, the code may be executable by the processor to detect a stretch gesture if a change in distance between two touch inputs is greater than a stretch threshold change. That is, if the change in distance between a thumb touch input and a forefinger touch input is greater than a threshold change in a direction indicating that a stretch is being performed (e.g., distance between touch inputs is increasing), a stretch gesture may be detected. Responsive to detection of the stretch gesture, the code may be executable to change the scrollable list of items to another content viewing mode. In the example illustrated in FIG. 2, detection of a stretch gesture results in the scrollable list of items being changed to the first content viewing mode. It will be appreciated that "first content viewing mode" and "second content viewing mode" may be relative terms indicating a transition from one content viewing mode to another content viewing mode.

The above-described pinch threshold and stretch threshold changes for dynamic multi-touch gestures may include any suitable threshold parameters. Examples include, but are not limited to, a temporal parameter and/or a spatial parameter, such that a dynamic multi-touch gesture may be detected if a change in distance between two touch inputs used for the dynamic multi-touch gesture is greater than a distance threshold change and/or occurs within a threshold period of time.

Referring now to FIG. 3, a schematic view of an embodiment of a hand-held mobile computing device 300 displaying a scrollable list of text items in a graphical user interface on the touch-sensitive display 302 is shown. Here, a scrollable list of text items is displayed on the graphical user interface in two different content viewing modes.

A first content viewing mode 304 illustrates a scrollable list of e-mail messages. Each of the e-mail messages includes a first set of content, such as a sender (e.g., User #1), a recipient (e.g., User #2), a subject (e.g., "Meeting"), and a date (e.g., Apr. 2, 2009). In this example, a dynamic multi-touch gesture may be detected over the scrollable list at the surface of the touch-sensitive display of the handheld mobile computing device. Responsive to detection of a dynamic multi-touch gesture, the code is executable to display a second content viewing mode 306 displaying a second set of content having a different amount of text than the first set of content.

In one specific embodiment, the dynamic multi-touch gesture may comprise a pinch gesture. Thus, code of the hand-held mobile computing device may detect a pinch gesture over the scrollable list and responsive to the detection of the pinch gesture, change to display the second content viewing mode 306 visualizing a second set of content. In this example, the second set of content includes a sender (e.g., User #2) and a recipient (e.g., User #1) for each e-mail message. Thus, if the dynamic multi-touch gesture is a pinch gesture, the second set of content may comprise a lesser amount of text for each e-mail message than the first set of content. Further, the first set of content and the second set of content may be displayed at a same zoom setting, or at different zoom settings, in various embodiments. Accordingly, a greater number of e-mail messages may be viewable on the touch-sensitive display when displayed in the second content viewing mode 306 compared to when displayed in the first content viewing mode 304 due to the lesser amount of text displayed for each e-mail message.

The touch-sensitive display 302 may also be configured to detect a stretch gesture over the scrollable list, and the code of the handheld mobile computing device 300 may be executable to change the scrollable list of items back to the first content viewing mode 304 visualizing the first set of content.

This may occur, for example, when the stretch gesture is detected over the touch-sensitive display 302 while displaying the scrollable list of e-mail messages in the second content viewing mode 306.

The first content viewing mode 304 and the second content viewing mode 306 may each be one of a discrete number of content viewing modes. That is, the code may be executable to change a scrollable list of items between a finite number of viewing modes.

When a user begins to perform a dynamic multi-touch gesture over a scrollable list displayed in an initial content viewing mode, the graphical user interface may appear to be changing or moving to track the user's gesture, so as to provide feedback to the user that user input is being detected. If a user stops the gesture before reaching the threshold to cause the content viewing mode to change, then the graphical user interface may change back to display the initial content viewing mode, instead of changing to display a second content viewing mode.

Figure 4:
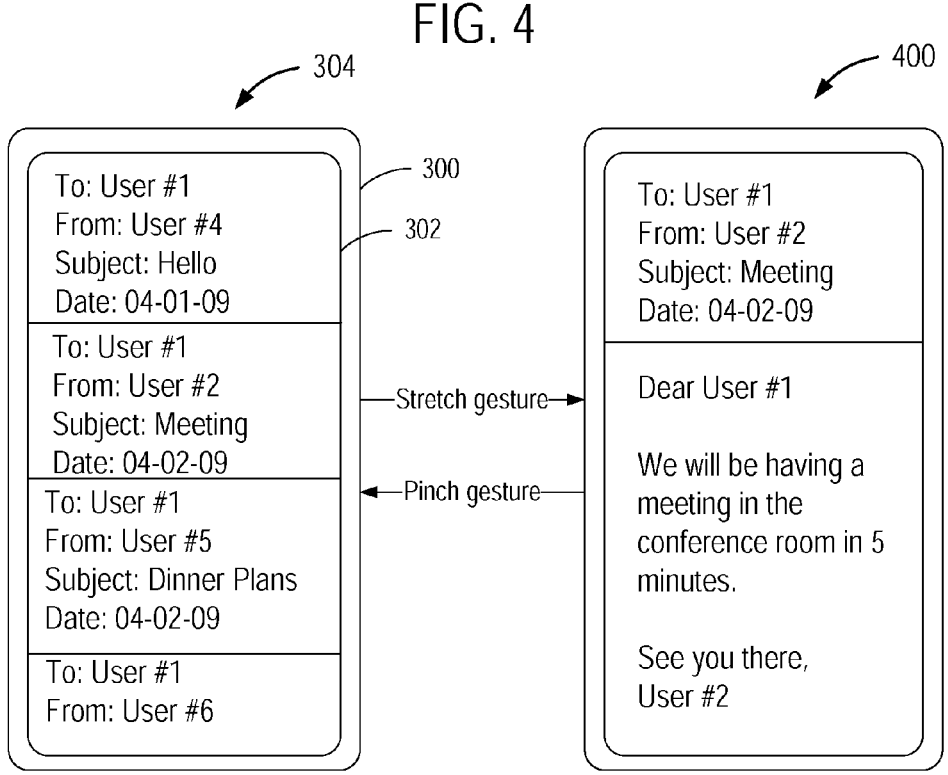
FIG. 4 is a schematic view of another embodiment of a hand-held mobile computing device displaying a scrollable list of text items in two content viewing modes.

FIG. 4 is a schematic view of another embodiment of handheld mobile computing device 300, depicting a stretch gesture performed over the scrollable list while the graphical user interface is displaying the scrollable list in the first content viewing mode 304. Upon detection of the stretch gesture, the code may be executable to change to display a third content viewing mode 400. The third content viewing mode 400 may include a third set of content for each of the items, such as a sender, a recipient, a subject, a date, and a content of the e-mail message. That is, the third set of content may include a greater amount of text than the first set of content (or the second set of content depicted in FIG. 3) when a stretch gesture is detected over a scrollable list displayed in the first content viewing mode 304. Responsive to detection of a pinch gesture over the scrollable list displayed in the third content viewing mode 400, the code may be executable to change the scrollable list back to the first content viewing mode 304. It will be understood that the terms "first, second and third" as used herein to describe the various depicted content view mode embodiments are used for the purpose of illustration, and are not intended to signify any number or order of content modes used by any of the disclosed embodiments. For example, in some embodiments, the content viewing mode described as the "third" content mode with reference to FIG. 4 may be one of two possible viewing modes. In other embodiments, four or more content viewing modes may be supported.

Figure 5:
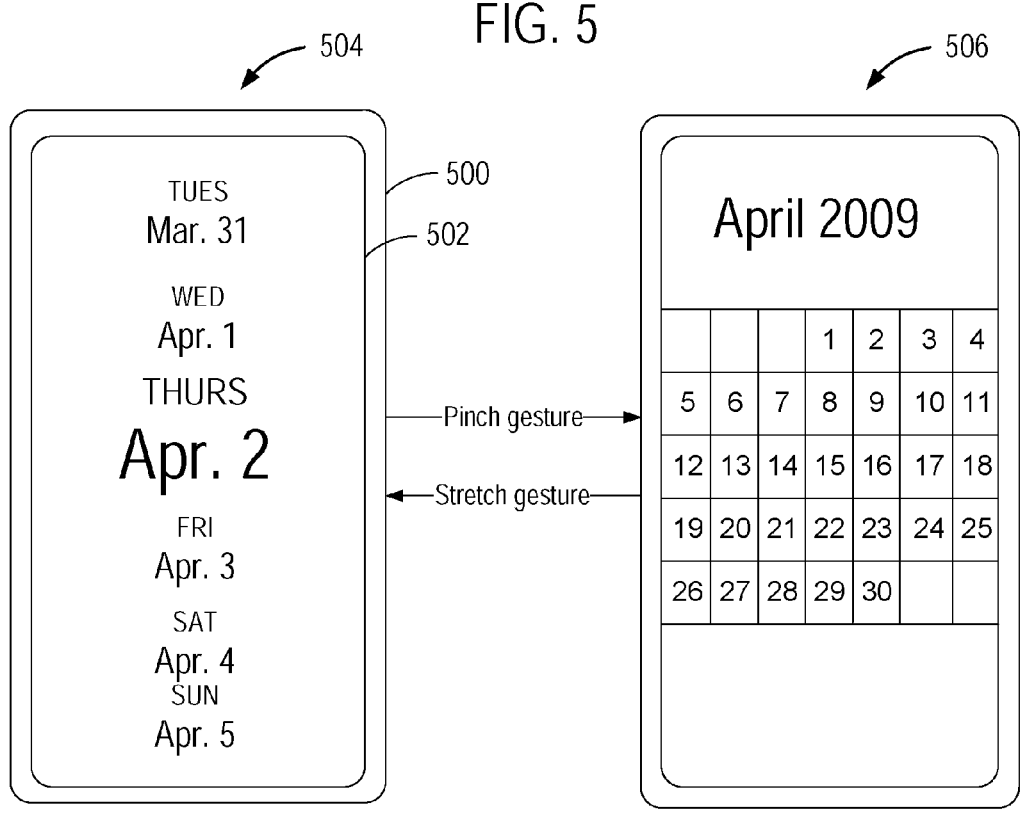
FIG. 5 is a schematic view of an embodiment of a hand-held mobile computing device displaying a scrollable list of calendar items in two content viewing modes.

Referring now to FIG. 5, a schematic view of an embodiment of a hand-held mobile computing device 500 displaying a scrollable list of calendar items in two different content viewing modes is shown. A scrollable list of calendar items is displayed in a graphical user interface on touch-sensitive display 502, in a first content viewing mode 504. The first content viewing mode 504 visualizes a first set of content for each calendar item. Here, the first set of content includes the date of the week (e.g., Thursday) and the date of the month (e.g., 2) for each calendar item. Responsive to detection of a pinch gesture over the scrollable list of calendar items displayed in the first content viewing mode 504, code included in memory of the handheld mobile computing device 500 may be executable to change to display a scrollable list of calendar items in a second content viewing mode 506. The second content viewing mode 506 includes a second set of content (e.g., date of the month) for each calendar item. Further, the second set of content may comprise a different layout than the first set of content, as illustrated by the month grid layout of the second content viewing mode 506 in contrast to the linear list layout of the first content viewing mode 504.

Responsive to detection of a stretch gesture over the scrollable list of calendar items displayed in the second content viewing mode 506, the code may execute to change the graphical user interface to display the first content viewing mode 504 with the first set of content.

Figure 6:
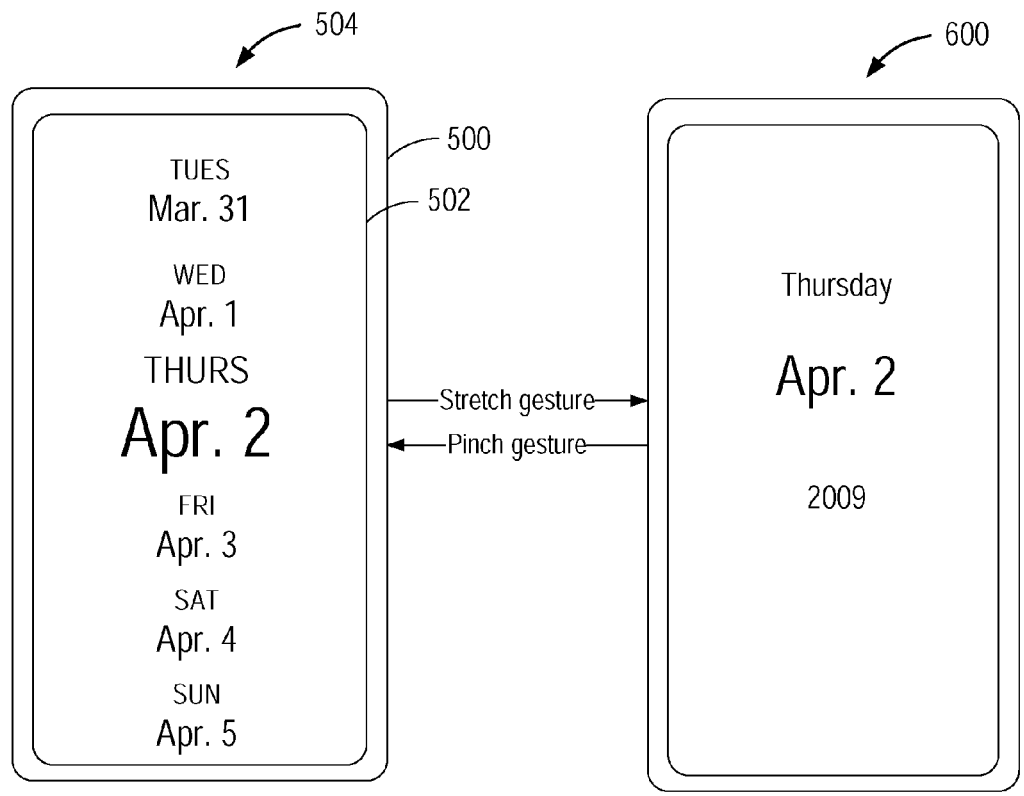
FIG. 6 is a schematic view of another embodiment of a hand-held mobile computing device displaying a scrollable list of calendar items in two content viewing modes.

Referring now to FIG. 6, the touch-sensitive display 502 is shown changing from the first content viewing mode 504 to a third content viewing mode 600 including a third set of content (e.g., date of week, date of month, year). Responsive to detection of a pinch gesture over the scrollable list of calendar items displayed in the third content viewing mode, the code may change to display the scrollable list in the first content viewing mode 504.

Referring now to FIG. 7, a schematic view of an embodiment of a hand-held mobile computing device 700 displaying a scrollable list of image items in a graphical user interface of a touch-sensitive display 702 is provided. A first content viewing mode 704 illustrates a scrollable list of image items with a first set of content (e.g., size) for each image item. If a pinch gesture is detected, code stored on the handheld mobile computing device 700 may be executable to display the scrollable list of image items in a second content viewing mode 706, visualizing a second set of content. In this example, the second set of content includes a smaller size for each image displayed in the second content viewing mode 706. The first set of content and the second set of content may also specify a zoom setting, a resolution, and/or a magnification for each image, where the first set of content and the second set of content are different. Also, more images may be displayed on the touch-sensitive display 702 in the second content viewing mode 706 than in the first content viewing mode 704, in this example. Responsive to a stretch gesture over the scrollable list of image items displayed in the second content viewing mode 706, the code may be executable to change back to display the scrollable list of items in the first content viewing mode 704.

Referring to FIG. 8, hand-held mobile computing device 700 is shown changing from the first content viewing mode 704 to a third content viewing mode 800 responsive to a stretch input gesture, where the third set of content includes a larger size for each image item than the first set of content. In this example, one image (e.g., "image 10") is viewable at a time in the scrollable list of image items of third content viewing mode 800. Responsive to a pinch gesture over the scrollable list of image items displayed in the third content viewing mode 800, the code may be executable to change back to display the scrollable list of items in the first content viewing mode 704.

FIG. 9 is a flowchart illustrating an embodiment of a method 900 for operating a hand-held mobile computing device. At 910, method 900 comprises displaying a graphical user interface on a touch-sensitive display of a hand-held mobile computing device and at 912, displaying a scrollable list of items on the graphical user interface in a first content viewing mode. Then, at 914, method 900 comprises detecting a first dynamic multi-touch gesture over the scrollable list, and responsive to detection of the first gesture, changing the scrollable list to be displayed in a second content viewing mode at 916.

Next, at 918, it is determined if a second gesture is detected. If the answer is yes at 918, the method 900 may include changing to display a scrollable list of items in the first content viewing mode at 920. If the answer is no at 918, and a first gesture is detected at 922, the code on the hand-held mobile computing device code may be executed to change to display a third content viewing mode at 924. If the answer is no at 922, the method 900 may end.

In some embodiments, the first gesture described with respect to the method 900 may be a dynamic pinch gesture and the second gesture may be a dynamic stretch gesture as described above, or vice versa.

Further, there may be any suitable number of content viewing modes, and the content viewing modes may be arranged to appear in a particular series, or order, responsive to successive pinch gestures, successive stretch gestures, or any other dynamic multi-touch gesture. For example, a plurality of successive pinch gestures may be detected, and the scrollable list may be changed to be displayed in a distinct content viewing mode with each pinch gesture. Responsive to each pinch gesture, the graphical user interface may change to display the scrollable list in a next content viewing mode in the predefined order of content viewing modes. In a similar manner, successive stretch gestures may result in changing to distinct content viewing modes in an order that is a reverse order of the predefined order for successive pinch gestures.

Further still, if an oversized dynamic multi-touch gesture is detected, the display of a scrollable list in a content viewing mode of a predefined order may be skipped. For example, an oversized stretch gesture may be detected over a scrollable list of items in a first content viewing mode. Accordingly, the code may be executed to change to display a third content viewing mode thereby bypassing the second content viewing mode. An oversized dynamic multi-touch gesture may be a dynamic multi-touch gesture where a change in distance between two touch inputs of the multi-touch gesture is greater than an oversized threshold change. In another example, the oversized dynamic multi-touch gesture may be detected as a change in distance between two touch inputs of the multi-touch gesture over a predetermined period of time.

Figure 10:
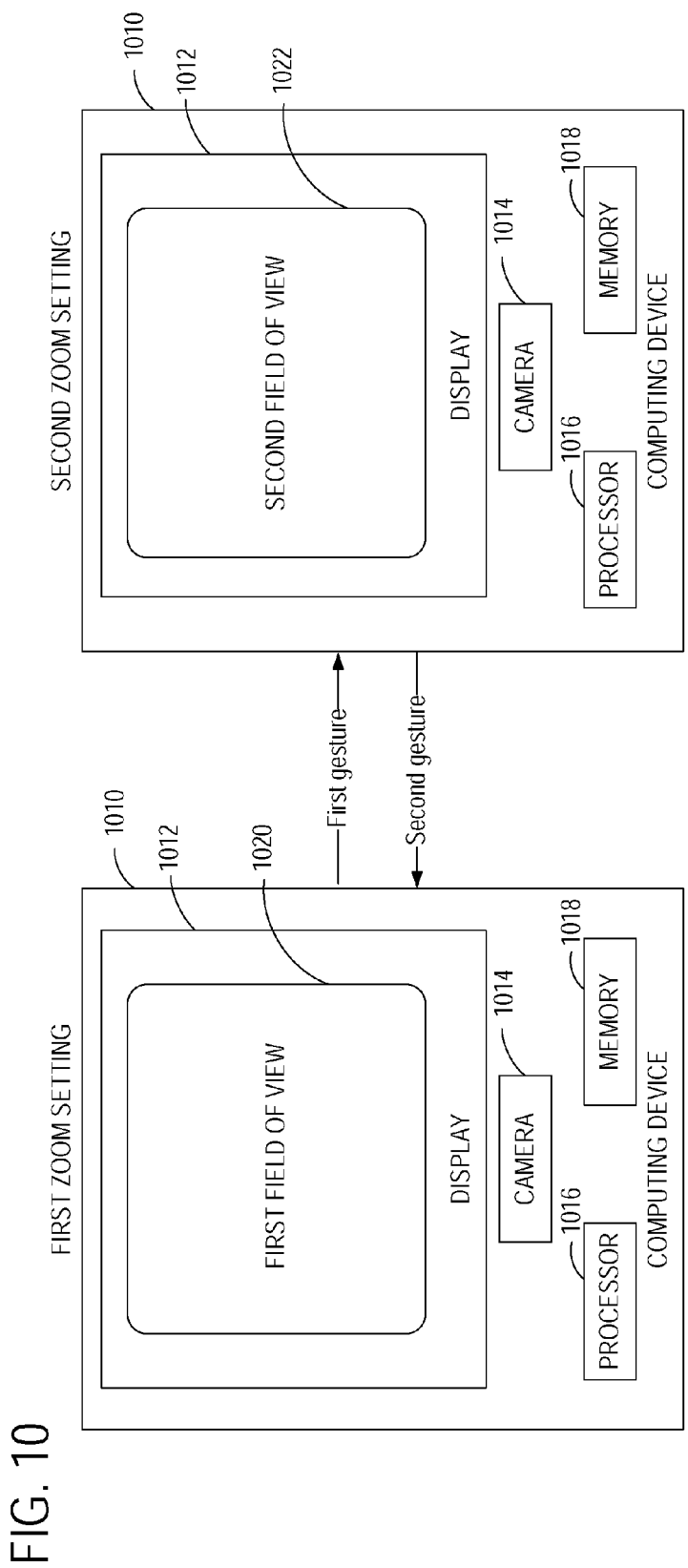
FIG. 10 is a schematic view of an embodiment of a hand-held mobile computing device at two different zoom settings in a camera capture mode.

Turning to FIG. 10, a schematic view of an embodiment of a hand-held mobile computing device at various zoom settings in a camera capture mode is provided. The hand-held mobile computing device 1010 includes a touch-sensitive display 1012 forming a surface of the hand-held mobile computing device 1010. The hand-held mobile computing device 1010 also includes a camera 1014 configured to acquire an image, a processor 1016, and memory 1018 comprising code executable by the processor 1016 to operate the camera 1014.

For example, the code may be executable to display a first field of view 1020 of the camera 1014 at a first zoom setting on the touch-sensitive display 1012, to detect a dynamic multi-touch gesture input over the touch-sensitive display 1012 and to display a second field of view 1022 of the camera 1014 at a second zoom setting on the touch-sensitive display 1012, responsive to detection of the dynamic multi-touch gesture input. In some, the code may be executable to snap from one zoom setting to another zoom setting, while in other embodiments, the zoom may occur in a continuous manner based on the change in distance between two touch inputs of a dynamic multi-touch gesture. For example, the field of view of the camera may continuously widen with a pinch gesture as a change in distance between two touch inputs decreases, and continuously narrow with a stretch gesture as a change in distance between two touch inputs increases.

Figure 11:
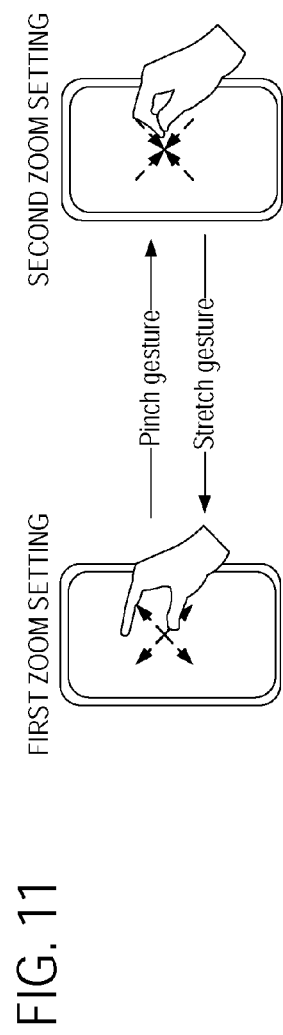
FIG. 11 schematically shows embodiments of touch input gestures on a hand-held mobile computing device in a camera capture mode.

In specific embodiments, dynamic multi-touch gesture inputs may include pinch and stretch gestures, embodiments of which are illustrated in FIG. 11. As described above, detection of a pinch or stretch gesture may be based on a change in distance between two touch inputs. Responsive to a pinch gesture on the surface of the touch-sensitive display 1012, a field of view of the camera may widen, and responsive to a stretch gesture over the surface of the touch-sensitive display 1012, a field of view of the camera may narrow.

Figure 12:
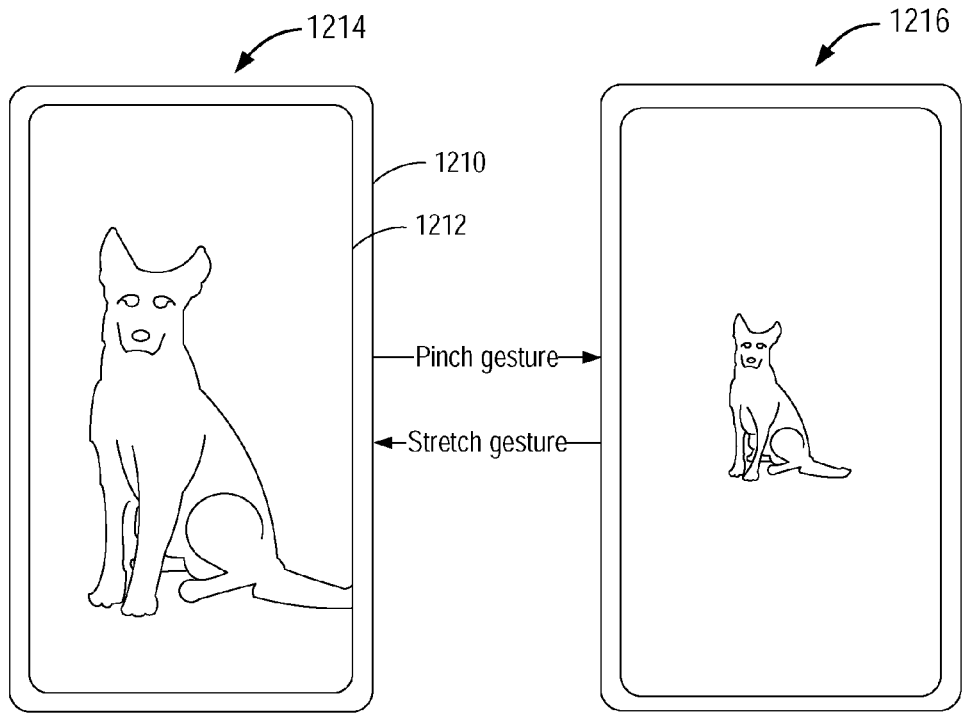
FIG. 12 is a schematic view of an embodiment of a hand-held mobile computing device at two different zoom settings in a camera capture mode.
Figure 13:
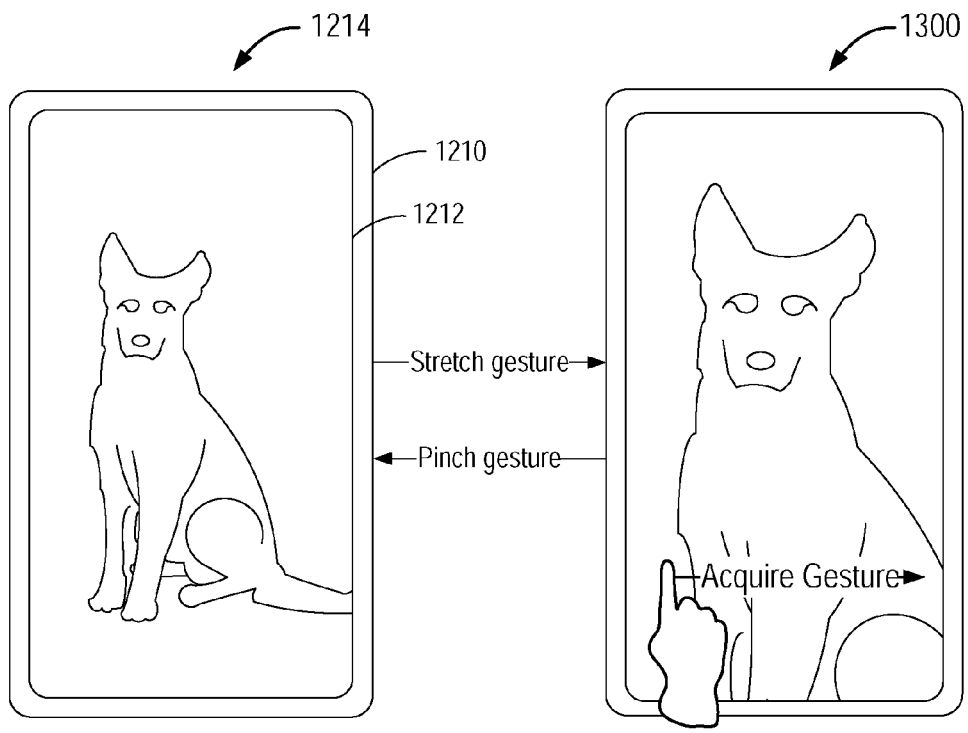
FIG. 13 is a schematic view of another embodiment of a hand-held mobile computing device at two different zoom settings in a camera capture mode.

FIGS. 12 and 13 illustrate a zooming operation performed on an image of an animal. In FIG. 12, a first field of view of the camera is shown at a first zoom setting 1214. A dynamic multi-touch gesture comprising a dynamic pinch gesture is detected over the surface of touch-sensitive display 1212 while at the first zoom setting 1214 and, responsive to the detection, the touch-sensitive display 1212 shows the field of view of the camera while at the second zoom setting 1216, wherein the second field of view of the camera has a wider angle than the first field of view of the camera (i.e. the camera zooms out). Likewise, responsive to detection of a dynamic stretch gesture over the touch-sensitive display 1212 while displaying the second zoom setting 1216, the code of the hand-held mobile computing device 1210 may be executed to display the graphical user interface at the first zoom setting 1214 (i.e. the camera zooms in). Next, as shown in FIG. 13, if a dynamic stretch gesture is detected over the graphical user interface while at the first zoom setting 1214, the camera zooms in to display the field of view at a third zoom setting 1300 with a narrower angle than the first zoom setting 1214 (i.e. the camera zooms in).

FIG. 13 also depicts an example of a gesture that may be used to acquire an image once at a desired zoom setting. Specifically, a one touch-input swipe gesture is illustrated at the second zoom setting 1300 of FIG. 13. In response to detection of the acquire gesture input, the camera may acquire an image of the scene displayed on the touch-sensitive display and save the image to memory on the hand-held mobile computing device 1210.

It may be appreciated that the hand-held mobile computing device 1210 may include code executable by a processor to perform any of the functions described herein, besides those described specifically with respect to operation in the camera capture mode.

It will further be appreciated that the mobile computing devices described herein may be any suitable mobile computing device configured to execute the executable code, or programs, described herein. For example, the mobile computing devices may be laptop computer such as a netbook, a portable data assistant (PDA), computer-enabled wireless telephone, portable media player, etc. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A hand-held mobile computing device, comprising:
    a touch-sensitive display forming a surface of the hand-held mobile computing device;
    a processor; and
    memory comprising code executable by the processor to:

display a scrollable list of items in a first content viewing mode having a first set of content for each of the items in the scrollable list, wherein the first content viewing mode comprises a linear list layout of the items;

detect a dynamic multi-touch gesture over the scrollable list of items; and responsive to detection of the dynamic multi-touch gesture, change the scrollable list of items to a second content viewing mode having a second set of content for each item in the scrollable list of items, wherein the second set of content is different from the first set of content, and wherein the second content viewing mode comprises a grid layout of the items.

2. The device of claim 1, where the memory further comprises code executable by the processor to detect a second dynamic multi-touch gesture over the items in the second content viewing mode, wherein the second dynamic multi-touch gesture comprises a pinch gesture, and to change from the second content viewing mode to the first viewing mode if a change in distance between two touch inputs used for the pinch gesture is greater than a threshold change.

3. The device of claim 1, wherein the dynamic multi-touch gesture comprises a stretch gesture, and wherein the code is executable by the processor to change the scrollable list of items to the second content viewing mode if a change in distance between two touch inputs used for the stretch gesture is greater than a threshold change.

4. The device of claim 1, where the items are calendar items and the first set of content includes a date of the week and a date of the month for each calendar item, and the second set of content includes a date of the month in a month grid layout.

5. The device of claim 4, where the first set of content and the second set of content are displayed at a same zoom setting.

6. A hand-held mobile computing device, comprising:

a touch-sensitive display forming a surface of the hand-held mobile computing device;

a processor; and memory comprising code executable by the processor to:

display a graphical user interface on the touch-sensitive display;

display on the graphical user interface items in a first content viewing mode visualizing a first set of content for each of the items, wherein the first content viewing mode comprises a linear list layout of the items;

detect a dynamic pinch gesture over the items in the first content viewing mode;

responsive to detection of the dynamic pinch gesture, change the first content viewing mode to a second content viewing mode visualizing a second set of content for each of the items, wherein the first content viewing mode and the second content viewing mode each comprise one of a discrete number of content viewing modes, wherein the second set of content is different from the first set of content, and wherein the second content viewing mode comprises a grid layout of the items;

detect a dynamic stretch gesture over the items in the second content viewing mode; and responsive to detection of the dynamic stretch gesture, change from the second content viewing mode to the first content viewing mode.

7. The device of claim 6, where the items are calendar items and the first set of content includes a date of the week and a date of the month for each calendar item and the second set of content includes a date of the month in a month grid layout.

8. The device of claim 6, where the code is configured to detect the dynamic pinch gesture if a change in distance between two touch inputs is greater than a pinch threshold change, and where the code is configured to detect the dynamic stretch gesture if a change in distance between two touch inputs is greater than a stretch threshold change.

* * * * *